United States Patent [19]

Knasel et al.

[11] Patent Number: 4,786,769

[45] Date of Patent: * Nov. 22, 1988

[54] SAFETY COUPLING DEVICE FOR ROBOTIC TOOLING

[75] Inventors: Harold E. Knasel, Springfield; David A. Grigsby, Medway, both of Ohio

[73] Assignee: Process Equipment Company, Tipp City, Ohio

[*] Notice: The portion of the term of this patent subsequent to Jan. 27, 2004 has been disclaimed.

[21] Appl. No.: 6,923

[22] Filed: Jan. 27, 1987

Related U.S. Application Data

[63] Continuation of Ser. No. 708,561, Mar. 6, 1985, Pat. No. 4,639,184.

[51] Int. Cl.$^4$ ............... B23J 9/00; H01H 3/16
[52] U.S. Cl. .................. 200/61.41; 414/230; 401/29; 401/49
[58] Field of Search .......... 200/6 A, 61.41, 61.42; 414/730; 901/13, 16, 29, 46, 49, 33; 33/539, 561, 572

[56] References Cited

U.S. PATENT DOCUMENTS

| | | | |
|---|---|---|---|
| 4,138,823 | 2/1979 | McMurtry | 33/559 X |
| 4,301,338 | 11/1981 | McMurtry | 200/6 A X |
| 4,523,063 | 6/1985 | Kroetsch | 33/561 X |
| 4,562,646 | 1/1986 | Dall'Aglio | 33/539 X |
| 4,625,417 | 12/1986 | Cusack | 33/561 X |
| 4,639,184 | 1/1987 | Knasel et al. | 901/29 X |
| 4,649,623 | 3/1987 | Schneider et al. | 33/561 X |

Primary Examiner—J. R. Scott
Attorney, Agent, or Firm—Jacox & Meckstroth

[57] ABSTRACT

A coupling device includes a first support member which is connected to the arm of a robot and which supports a second support member for universal tilting and axial movement from an aligned normal position. The second support member supports robotic tooling, and a set of springs and ball members bias the support members to the normal position. An electrical control circuit is effective to stop movement of the robot arm in response to minute tilting or axial movement of the second support member in the event the tooling or article carried by the tooling is accidentally hit or overloaded.

16 Claims, 2 Drawing Sheets

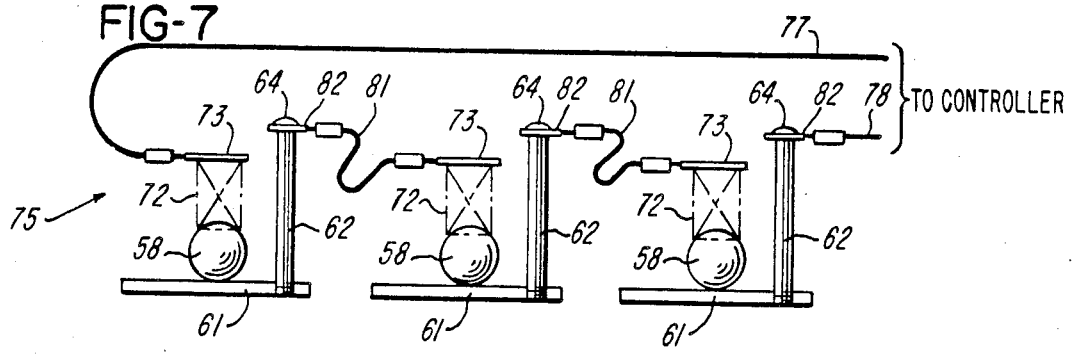
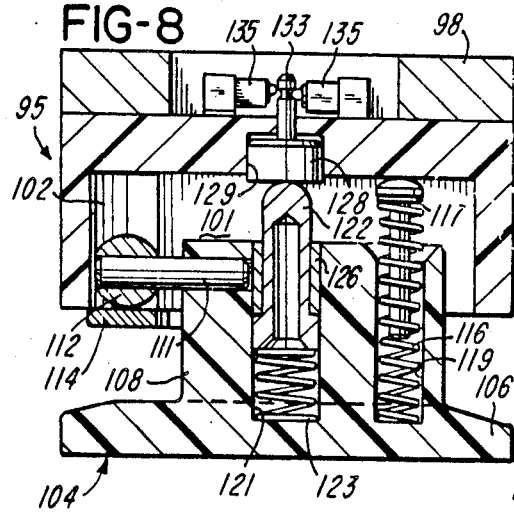
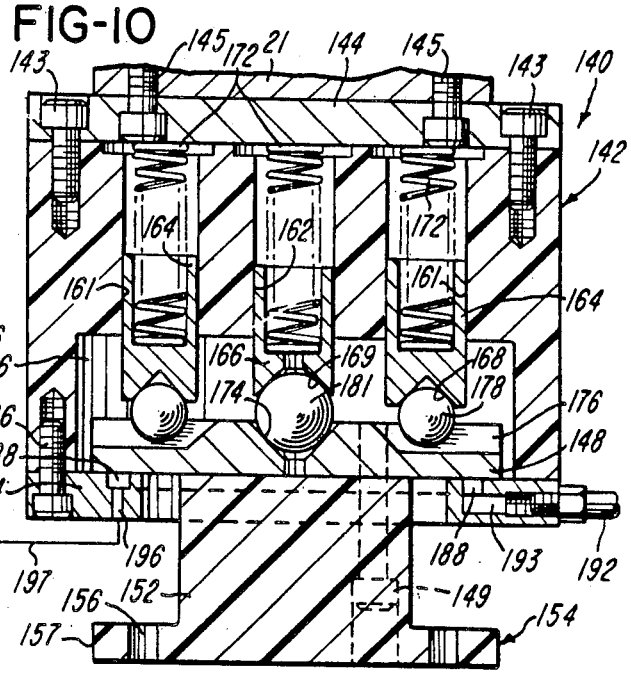
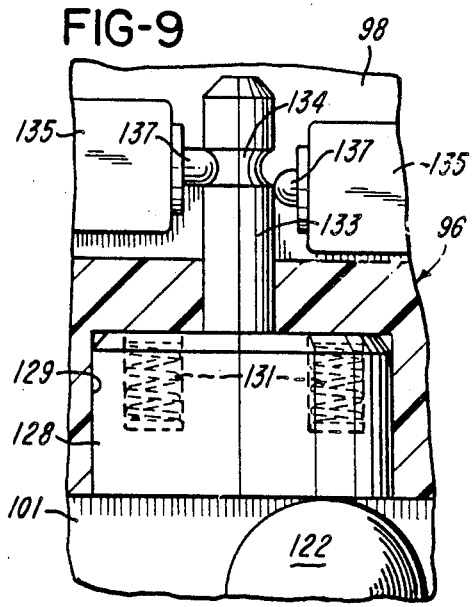
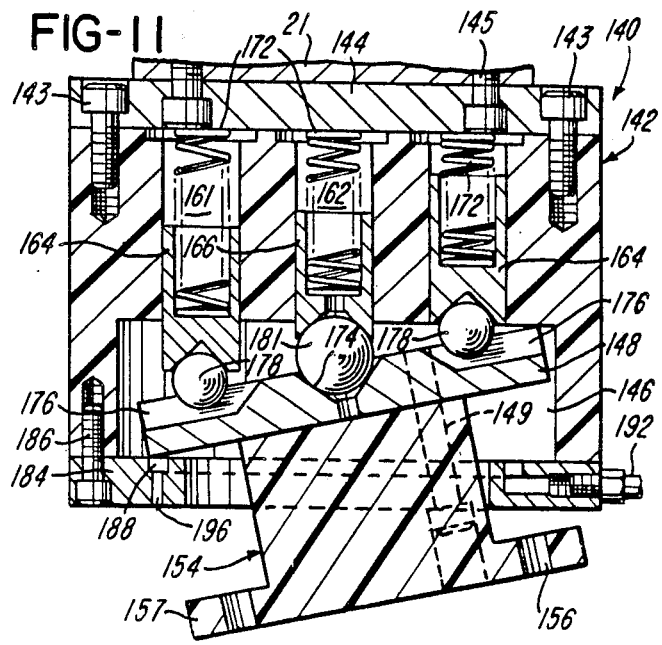

4,786,769

SAFETY COUPLING DEVICE FOR ROBOTIC TOOLING

This is a continuation of application Ser. No. 708,561, filed Mar. 6, 1985 now U.S. Pat. No. 4,639,184.

BACKGROUND OF THE INVENTION

In the use of numerically controlled or programmable robots, it is desirable to protect the robot and the tooling carried by the robot arm in addition to any article carried by the tooling in the event the article or tooling inadvertently or accidentally hits an object while the robot arm is in motion. Usually, such protection is provided by a coupling or link member which connects the robot arm to the tooling and is adapted to break or slip if the tooling or article carried by the tooling receives an impact or force. When a link member breaks, the tooling usually drops to the limit of a retaining chain or cable. A maintenance man or operator must then replace the link member and repair any damage to the robot and/or tooling before the robot may be placed back in operation. Usually, such replacement and/or repair requires substantial time, and this results in production down time for not only the robot but other associated equipment which the robot is serving.

One form of safety device or mechanism is disclosed in International Patent Application No. PCT/JP81/00377 published by the Japanese Patent Office on June 24, 1982. The mechanism disclosed in this patent application forms a coupling between the robot arm and the fixture or tooling supported by the arm and includes a weight element supported by a set of tension springs. Movement of the weight element in response to a lateral impact or force on the fixture or tooling results in actuating a switch which stops the movement of the robot arm. However, if the tooling or article carried by the tooling inadvertently hits a stationary object or an object having substantial mass, the robot arm or tooling or article may be damaged before the robot arm stops. If the tooling or robot arm is bent, substantial down time may be required to repair the arm or tooling and also realign the tooling with respect to the robot arm.

SUMMARY OF THE INVENTION

The present invention is directed to an improved safety wrist or coupling device for connecting a robot arm to a fixture or tooling and which provides for immediately stopping the movement of the robot arm and tooling in the event the arm or tooling or article carried by the tooling accidentally receives any interfering impact or force during movement of the robot arm. The safety coupling of the invention also provides for substantial tilting and axial movement of the tooling relative to the arm in response to the interfering force in order to prevent any damage to the tooling or robot. In addition, the coupling automatically realigns the tooling with respect to the robot arm as soon as the interfering force is removed. Also, the coupling device of the invention responds to minute tilting or axial movement of the tooling relative to the robot arm and immediately controls or actuates the emergency stop circuit for the robot.

In general, the above features and advantages are provided by a safety coupling which is compact and has a low mass and which includes a first body or support member adapted to be rigidly secured to the robot mounting flange. The first support member receives a second support member which is adapted to be rigidly secured to the tooling or device which is moved by the robot along a preprogrammed path. The first and second support members of the coupling device are interconnected to provide for a relative axial and tilting movement in a multi-axis universal direction from a normal position where the support members are precisely aligned. A set of spring-biased balls provide for the tilting movement and are effective to return the support members to the normal position when the force producing the tilting movement is released. The coupling device also incorporates an electrical circuit with a switch system which opens the circuit in response to minute tilting or axial movement of the second support member relative to the first support member.

Other features and advantages of the invention will be apparent from the following description, the accompanying drawings and the appended claims.

BRIEF DESCRIPTION OF THE DRAWINGS

FIG. 7 is a diagrammatic view of the components in the coupling device shown in FIGS. 1-6 for forming a control switch system;

FIG. 8 is an axial section similar to FIG. 3 and showing a coupling device constructed in accordance with another embodiment of the invention;

FIG. 9 is an enlarged fragmentary section of the control components used in the embodiment shown in FIG. 8;

FIG. 10 is an axial section similar to FIG. 3 and showing a further embodiment of a coupling device constructed in accordance with the invention; and FIG. 11 is an axial section of the device shown in FIG. 10 and illustrating the maximum tilt relationship.

DESCRIPTION OF THE PREFERRED EMBODIMENTS

Figure 1:
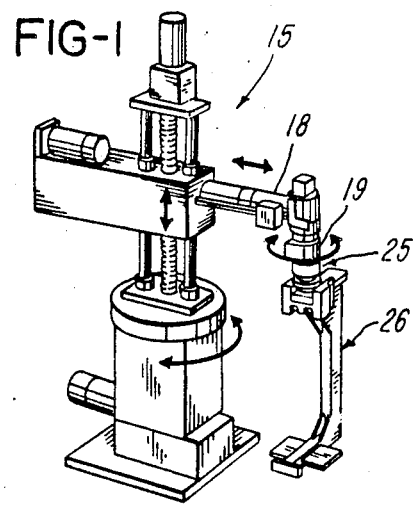
FIG. 1 is a perspective view of a programmable robot incorporating a safety coupling device constructed in accordance with the invention for supporting a specific tooling component.
Figure 3:
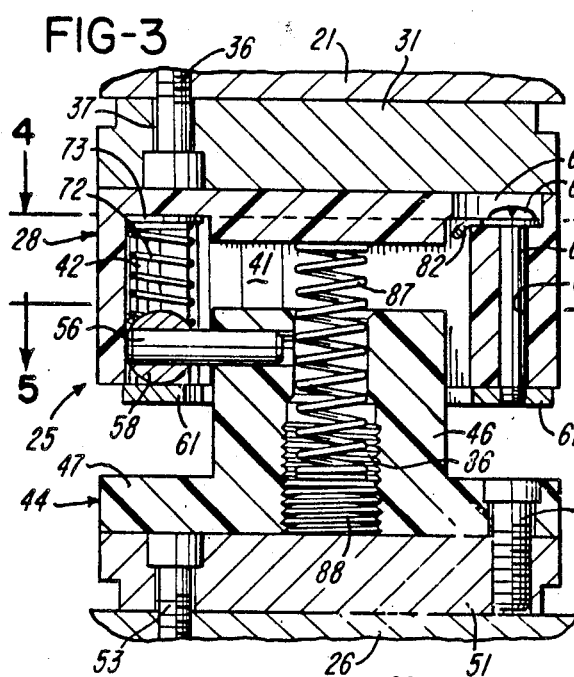
FIG. 3 is an axial section of the coupling device taken generally along the line 3—3 of FIG. 2 and showing the attachment of the device to the robot arm and to the tooling.

FIG. 1 illustrates a numerically controlled programmable robot 15 of the type manufactured by GMF Robotics Corporation in Troy, Mich. and identified as Model M1. However, it is to be understood that the coupling device of the present invention may be used with any form of robot, transfer or positioning mechanism or manipulator and is not limited to the particular form of robot illustrated. The robot 15 includes a horizontal movable arm 18 which supports a reversing motor 19 having a rotatable bottom mounting flange 21 (FIG. 3). In accordance with the present invention, a safety device or coupling 25 connects the mounting flange 21 to a depending fixture or tooling 26 constructed for gripping and transferring an article. As used herein, the term "tooling" includes any type of fixture or article transporting device or work performing device such as, for example, a welding head.

Referring to FIGS. 2-6, the safety device or coupling 25 includes a first or upper body or support member 28 which is preferably made from a high strength rigid plastics material having a high strength/weight ratio. The upper support member 28 is secured to an adaptor plate 31 by a set of cap screws 32 (FIG. 6) which extend upwardly through counterbored holes 33 within the support member 28. The adapter plate 31 is secured to the robot mounting flange 21 by a set of cap screws 36 which extend through corresponding counterbored holes 37 within the adaptor plate 31.

The upper support member 28 defines a generally cylindrical cavity or chamber 41, and a set of three cylindrical bores 42 extend vertically within the support member 28, intersecting the chamber 41 at uniformly spaced locations. The coupling 25 also includes a second or lower support body or member 44 also made of a high strength plastics material and having a cylindrical hub portion 46 projecting upwardly from a flange portion 47. A set of cap screws 49 secure the flange portion 47 to an adaptor plate 51 which is rigidly secured to the tooling 26 by a set of cap screws 53.

Figure 5:
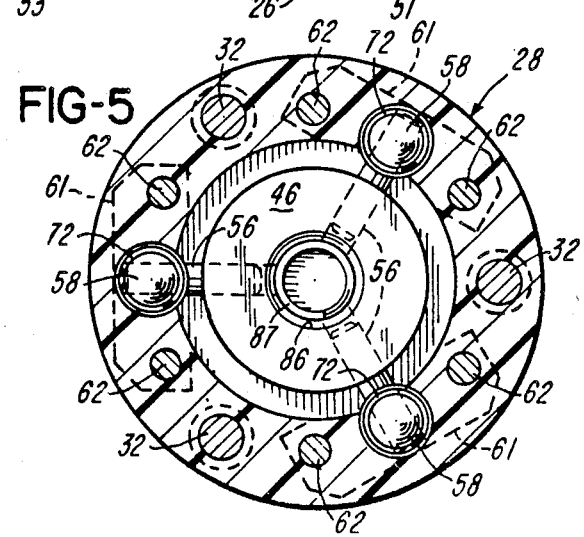
FIG. 5 is a section taken generally on a line 5—5 of FIG. 3.
Figure 6:
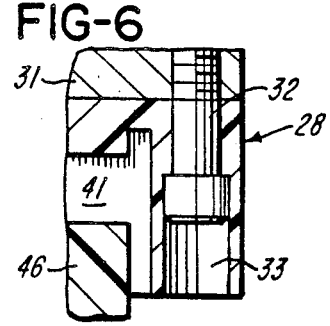
FIG. 6 is a fragmentary section taken generally on the line 6—6 of FIG. 2.

As shown in FIGS. 3 and 5, a set of three spoke-like pins 56 project radially outwardly from the hub portion 46 of the lower support member 44 and into the corresponding bores 42 within the upper support member 28. A part spherical metal ball member 58 is slidably mounted on each pin 56 and is closely confined within the corresponding cylindrical bore 42. Each of the ball members 58 engages a corresponding flat metal contact plate 61 which is secured to the bottom of the support member 28 by a pair of screws 62 extending within vertical holes 63 formed within the upper support member 28. Each of the screws 62 has a head 64, and three of the heads 64 are recessed within corresponding slots 66 formed within the top surface of the support member 28. The heads 64 of the other three screws 62 are located within cylindrical recesses 68 formed within the top surface.

Figure 2:
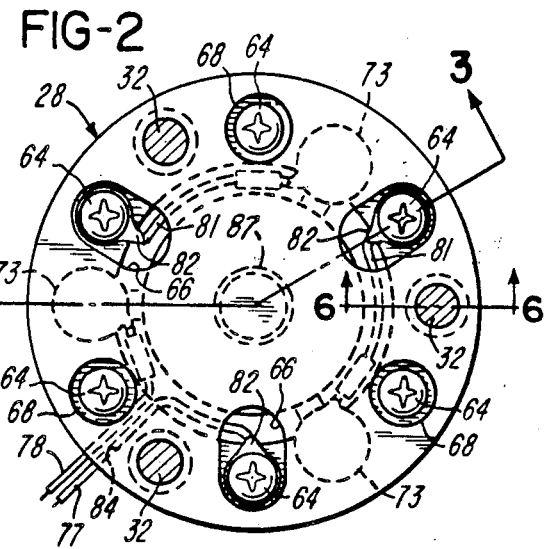
FIG. 2 is a plan view of the coupling device shown in FIG. 1.
Figure 4:
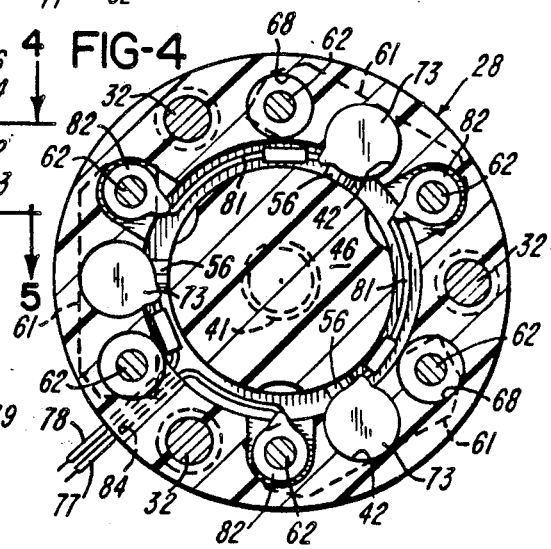
FIG. 4 is a section taken generally on the line 4—4 of FIG. 3.

A compression spring 72 is confined within each of the bores 42 and has a bottom end which seats on the corresponding ball member 58. The upper end of each spring 72 engages a circular metal contact plate 73 (FIGS. 3 and 4) located within the upper end of the bore 42. As illustrated in FIG. 7, the metal ball members 58, metal contact plates 61, springs 72, contact plates 73 and screws 62 form part of an electrical control circuit 75 wherein the three sets of these components are connected in series with wire conductors 77 and 78 by wire conductors 81 and ring terminals 82. Each of the conductors 81 connects one of the contact plates 73 to one of the terminals 82 retained by the screws 62. As shown in FIGS. 2 and 4, the conductor wires 81 extend around the upper end of the chamber 41 within a groove, and the conductors 77 and 78 extend outwardly through a radial hole 84 within the upper support member 28. The conductors 77 & 78 are connected to the ground side or hot side of an emergency stop circuit or an input/output circuit (not shown) for programming the robot 15. As shown in FIG. 3, the hub portion 46 of the lower support member 44 has a threaded center hole 86 which confines a compression spring 87 extending from the top inner surface of the upper support member 28 to an adjustable plug 88 threaded into the lower portion of the hole 86.

In operation of the coupling device 25 described above in connection with FIGS. 1-7, the set of three compression springs 72 cooperate with the compression spring 86 to urge or bias the lower support member 44 away from the upper support member 28 to an aligned normal position when the three ball members 58 engage the corresponding contact plates 61. This biasing force may be adjusted by adjusting the plug 88 within the bore 86 and/or by selecting springs 72 and/or 86 having different spring rates. The biasing force is selected according to the load carried by the coupling 25 as determined by the weight of the tooling 26 and the article being transported by the tooling.

It is apparent that the connection of the upper and lower support members by the spring loaded ball members 58 slidably mounted both within the bores 42 and on the radial pins 56, provides for universal tilting movement of the tooling support member 44 relative to the upper support member 28 and also permits relative axial movement of the support member 44 into the support member 28. Thus if the tooling 26 or an article carried by the tooling inadvertently hits an object during movement of the robot arm 18, the tooling and the tooling support member 44 will tilt or move relative to the upper support member 28. It is also apparent that any movement of the tooling support member 44 relative to the upper support member 28 would cause at least one of the ball members 58 to separate from its corresponding contact plate 61. This separation opens the circuit with respect to the conductors 77 and 78 causing an immediate signal to stop any movement of the robot arm 18. With the biasing and axial movement allowed, the robot can overtravel or coast a short distance without damaging the tooling or robot. As soon as the force is removed from the tooling 26, the tooling and lower support member 44 return to the aligned normal position (FIG. 3) when all of the ball members 58 engage the corresponding contact plates 61 and again complete the circuit.

Referring to FIGS. 8 and 9 which show another embodiment of a safety coupling device 95 constructed in accordance with the invention, an upper support body or member 96 is adapted to be secured to the robot mounting flange 21 by an annular adaptor plate 98 in the same manner as described above for the attachment of the support member 28. The upper support member 96 has a chamber or cavity 101 which intersects a set of three angularly spaced cylindrical bores 102. The coupling member 95 also includes a lower support body or member 104 having a bottom flange portion 106 and a hub portion 108 projecting upwardly into the cavity 101, similar to the arrangement described above for the embodiment shown in FIGS. 2-6.

A set of three angularly spaced pins 111 are supported by the hub portion 108 and project radially outwardly to support corresponding ball members 112 within the cylindrical bores 102. A set of three contact plates 114 attached to the bottom surface of the support member 96 in the same manner as the attachment of the plates 61 described above in reference to FIGS. 3-5. The balls 112 are normally urged or biased against the plates 114 by a set of three compression springs 116 surrounding corresponding plungers 117 and retained within corresponding holes 119 within the hub portion 108 of the lower support member 104. Thus the support members 96 and 104 are coupled or connected together to provide for relative tilting and/or axial movement in a manner similar to the tilting movement between the support members 28 and 44 described above.

A bore or hole 121 is formed within the center of the hub portion 108 and confines a plunger 122 and a compression spring 123 which urges or biases the plunger 122 upwardly against a stop sleeve 126 pressed into the bore 121. The upper rounded end of the plunger 122 engages the flat bottom surface of another plunger 128 slidably supported within a bore 129 formed within the upper support member 96. The plunger 128 is urged or biased downwardly against the plunger 122 by a set of compression springs 131 (FIG. 9) confined within holes formed within the top of the plunger 128. The plunger 128 also includes an actuating stem 133 which projects upwardly into the center of the adaptor plate 98 and has a circumferential groove 134. A pair of limit switches 135 are positioned in opposing relation within the adaptor plate 98 and with the stem 133 located between the actuating buttons or elements 137 of the switches. The switches 135 are connected in series on the ground side or hot side of the emergency stop circuit or an input-/output circuit for the robot in the same manner as the conductors 77 and 78.

In operation of the coupling device 95, the support members 96 and 104 are biased towards the aligned normal position (FIG. 8) wherein the ball members 112 engage the corresponding plates 114 as a result of the force exerted by the compressing springs 116. In the event the support member 104 is tilted or shifted axially by a minute degree or distance as the result of a force acting on the tooling 26 attached to the support member 104, the plunger 128 is shifted upwardly by a few thousandths of an inch causing the right limit switch 135 (FIG. 9) to open and the left limit switch (FIG. 9) to close. This insures that both switches are operating. The force exerted by the compression spring 123 is greater than the force exerted by the compression springs 131 so that the plunger 122 will depress the plunger 128 in response to minute tilting or axial movement of the support member 104 relative to the support member 96. Overtravel is accommodated by allowing plunger 122 to stop against plunger 128 and compress spring 123 as the lower support member 104 continues to move in a tilting or axial direction.

Another embodiment of a coupling device constructed in accordance with the invention is illustrated in FIGS. 10 and 11. In this embodiment, a coupling device 140 includes an upper support body or member 142 which is secured by a set of screws 143 to an adaptor plate 144, and a set of screws 145 secure the adaptor plate 144 to the robot mounting flange 21. The support member 142 has a cylindrical chamber or cavity 146 which receives a circular metal plate 148 secured by screws 149 to the hub portion 152 of a lower support member 154. A set of holes 156 are formed within the bottom flange portion 157 of the lower support member 154 and receive a set of screws (not shown) for securing the lower support member 154 to tooling such as the tooling 26.

A set of four uniformly spaced vertical holes 161 and a center vertical hole 162 are formed within the upper support member 142 and receive corresponding plungers 164 and 166 which have conical bottom surfaces 168 and 169. Each of the plungers 164 and 166 receives a compression spring 172 which urges the plunger downwardly within its corresponding hole 161 and 162. The plate 148 has a conical center cavity 174 and a set of four uniformly spaced and radially extending V-shaped notches or grooves 176. A set of four balls 178 are confined between the bottom surfaces 168 of the plungers 164 and the corresponding slots 176, and a larger ball 181 is confined between the bottom surface 169 of the center plunger 166 and the conical surface 174 within the center of the plate 148.

An annular metal plate 184 is secured to the bottom of the support member 142 by a set of peripherally spaced screws 186, and an annular groove 188 is formed within the top flat surface of the plate 184. The bottom surface of the metal plate 148 closes the annular groove 188, and the contacting surfaces of the plates 148 and 184 are lapped to form a substantially air tight seal between the surfaces. An air supply line 192 is connected to the annular groove 188 by a passage 193 within the plate 184 and supplies pressurized air to the groove 188 according to a predetermined pressure, for example, 10 psi. A passage 196 within the plate 184 connects the groove 188 to an air line 197 which extends to an air logic pressure control switch 198.

In operation of the embodiment described above in connection with FIGS. 10 and 11, the switch 198 is connected in series with the ground side or hot side of the emergency stop circuit or an input/output circuit for the robot 15 and is closed when the switch 198 receives or senses the air pressure within the groove 188 through the line 197. In the event the lower support member 154 is tilted in any direction or shifted axially by a minute amount, the plate 148 tilts or moves with respect to the plate 184 so that the air pressure within the groove 188 is released. When the air pressure is released, the switch 198 opens causing a signal to stop all movement of the robot arm 18. FIG. 11 illustrates the maximum angle of tilting of the lower support member 154 and tooling relative to the upper support member 142, but the air pressure within the groove 188 is released in response to the slightest movement of the plate 148 relative to the plate 184. When the force on the tooling 26 causing the movement of the plate 148 is released or removed, the spring loaded plungers 164 and 166 and the balls 178 and 181 automatically return the support members 142 and 154 to their aligned normal position shown in FIG. 10.

From the drawings and the above description, it is apparent that a coupling device constructed in accordance with the present invention, provides desirable features and advantages. For example, in each of the coupling embodiments described above, the upper and lower support members are normally held in precise alignment and in fixed relation by the compression springs and ball members. However, with a very minute relative tilting or axial movement between the support members, the emergency stop circuit opens and stops all movement of the robot. As another important feature, the connection of the support members provides for over travel in the tilting or axial movement in order to prevent damage to the robot or tooling or to an article or device carried by the tooling. As an additional feature, when the force producing the tilting or axial movement is released, the support members automatically return to their precisely aligned normal position or relationship so that operation of the robot may be quickly resumed with the minimum of down time. As mentioned above, the coupling embodiment described above in connection with FIGS. 10 and 11 uses a source of low pressure air to actuate the pressure switch 198. In comparison, the embodiments described in connection with FIGS. 1-9 operate with a direct switch actuation, either with the micro limit switches 135 or the switches produced by the metal components shown in FIG. 7.

While the forms of safety coupling apparatus herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. A device adapted for connecting a first element to a second element, comprising a first support member, means for rigidly securing said first support member to the first element, a second support member, means for rigidly securing said second support member to the second element, means connecting said first and second support members and providing for relative universal tilting movement between said first and second support members from a normal position where said first support member is in predetermined relation to said second support member, said connecting means including a plurality of pins spaced angularly about an axis and secured to one of said support members, a corresponding plurality of ball members slidably mounted on said pins, the other said support member having a corresponding plurality of slots each receiving one of said ball members for relative movement along a linear path, and means for biasing said first and second support members toward said normal position.

2. A device as defined in claim 1 wherein said biasing means comprise at least one axially movable plunger within one of said support members.

3. A device as defined in claim 1 and including means forming a positive stop for said first and second support members at said normal position.

4. A device as defined in claim 1 wherein said first support member includes means forming a planar surface, and said ball members contact said surface in said normal position.

5. A device as defined in claim 4 wherein said means forming said planar surface include a corresponding plurality of electrical conductive members, means forming an electrical circuit with said ball members electrically connected in series with said plate members, and said circuit opens by separation of at least one of said ball members from the corresponding said plate member in response to said tilting movement of said support members.

6. A device as defined in claim 1 wherein said connecting means is effective to prevent relative rotation between said first and second support members while providing for said tilting movement.

7. A device as defined in claim 1 wherein said first support member defines a cavity, said second support member includes a hub portion projecting into said cavity, said slots being part-cylindrical and extending in an axial direction within said first support member outwardly from said cavity, and said angularly spaced pins are mounted on said hub portion of said second support member and project radially outwardly into said slots for receiving said ball members.

8. A device adapted for connecting a first element to a second element, comprising a first support member, means for rigidly securing said first support member to the first element, a second support member, means for rigidly securing said second support member to the second element, means connecting said first and second support members and providing for relative universal tilting and axial movement between said first and second support members from a normal position where said first support member is in predetermined relation to said second support member, said connecting means further preventing relative rotation between said first and second support members while providing for said tilting movement, means forming a positive stop at said normal position, and means for biasing said first and second support members toward said normal position.

9. A device as defined in claim 8 wherein said first and second support members comprise bodies of an electrically insulating plastics material.

10. A device as defined in claim 8 wherein said first support member defines a cavity, said second support member includes a hub portion projecting into said cavity, means defining a plurality of angularly spaced part-cylindrical slots extending in an axial direction within said first support member and opening into said cavity, a corresponding plurality of angularly spaced pins mounted on said hub portion of said second support member and projecting radially outwardly into said slots, and a ball member slidably mounted on each said pin and confined within a corresponding said slot for linear movement in response to said relative tilting movement of said support members.

11. A device as defined in claim 8 wherein said means connecting said first and second support members comprise a plurality of angularly spaced pins secured to one of said support members, a corresponding plurality of ball members slidably mounted on said pins, the other said support member having a correspond plurality of angularly spaced slots each receiving one of said ball members for linear movement, and means forming a planar surface on the other said support member for engagement by said ball members to form said positive stop at said normal position.

12. A device as defined in claim 11 and including a set of compression springs within said slots and engaging the corresponding said ball members within said slots.

13. A device as defined in claim 8 wherein said connecting means comprise a set of electrical conductive balls, means forming an electrical circuit and including said balls electrically connected in series, and said circuit opens by movement of at least one of said balls in response to said tilting movement of said support members.

14. A device adapted for connecting a first element to a second element, comprising a first support member, means for rigidly securing said first support member to the first element, a second support member, means for rigidly securing said second support member to the second element, means connecting said first and second support members and providing for relative universal tilting movement between said first and second support members from a normal position where said first support member is in predetermined relation to said second support member, means for biasing said first and second support members toward said normal position, said connecting means including a set of relative moveable electrically conductive balls, an electrical circuit having means for electrically connecting said balls in series, and said circuit opens by movement of at least one of said balls in response to said tilting movement of said support members.

15. A device as defined in claim 14 wherein said means connecting said first and second support members comprise a plurality of angularly arranged radially extending pins secured to one of said support members, a corresponding plurality of said balls slidably mounted on said pins, and the other said support member has a corresponding plurality of angularly disposed parallel slots each receiving one of said balls for relative linear movement.

16. A device as defined in claim 15 wherein the other said support member member includes a corresponding plurality of plate members forming a planar surface, and said balls contact said plate members in said normal position.

* * * * *